(12) United States Patent
Park (10) Patent No.: US 9,238,940 B2
(45) Date of Patent: Jan. 19, 2016

(54) STRUCTURE OF ROLL BLIND USING DUAL ROLLER

(71) Applicant: Hyundai Motor Company, Seoul (KR)

(72) Inventor: Jae-Han Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/536,556

(22) Filed: Nov. 7, 2014

(65) Prior Publication Data

US 2015/0159432 A1    Jun. 11, 2015

(30) Foreign Application Priority Data

Dec. 9, 2013    (KR) .................... 10-2013-0152498

(51) Int. Cl.
*B60J 3/02*    (2006.01)
*E06B 9/70*    (2006.01)
*E06B 9/40*    (2006.01)
*B60J 7/00*    (2006.01)

(52) U.S. Cl.
CPC ............... *E06B 9/70* (2013.01); *B60J 3/0213* (2013.01); *B60J 7/0015* (2013.01); *E06B 9/40* (2013.01)

(58) Field of Classification Search
CPC ...... B60J 1/2013; B60J 1/2019; B60J 1/2036; B60J 1/205; B60J 1/2058; B60J 1/2061; B60J 1/2063; B60J 1/2066; B60J 7/0015

USPC ......... 296/214, 98, 37.16; 160/241, 262, 263, 160/86, 120, 370.22; 242/595.1
See application file for complete search history.

(56) References Cited

U.S. PATENT DOCUMENTS

| 2,331,454 | A | * | 10/1943 | Cooper .............................. 57/66 |
| 5,682,937 | A | * | 11/1997 | Decrane et al. ............... 160/133 |
| 8,002,341 | B2 | * | 8/2011 | Hotta et al. .................... 296/214 |
| 8,845,013 | B2 | * | 9/2014 | Lee ............................... 296/214 |

FOREIGN PATENT DOCUMENTS

| JP | 2006-335078 A | 12/2005 |
| KR | 10-2012-0115009 A | 10/2012 |
| KR | 10-2013-0096418 A | 8/2013 |

* cited by examiner

*Primary Examiner* — Dennis H Pedder
(74) *Attorney, Agent, or Firm* — Morgan, Lewis & Bockius LLP

(57) ABSTRACT

A structure of a roll blind that moves in a front-back direction of a vehicle to selectively shade a sunroof glass may include a pair of sunroof frames formed on both lower sides of the sunroof glass in a longitudinal direction of the vehicle, a main roller disposed at the one end of the sunroof frame in a vehicle width direction and can rotate through a motor, an idle roller disposed in the vehicle width direction adjacent to the main roller, a roller tube coupled to and wrapping the main roller and the idle roller to form a closed loop, and a roller guide coupled to both ends of the main roller and the idle roller and including a guide portion formed to protrude so that the blind maintains a constant height.

7 Claims, 5 Drawing Sheets

FIG. 10

STRUCTURE OF ROLL BLIND USING DUAL ROLLER

CROSS-REFERENCE TO RELATED APPLICATION

The present application claims priority to Korean Patent Application No. 10-2013-152498 filed Dec. 9, 2013, the entire contents of which is incorporated herein for all purposes by this reference.

BACKGROUND OF THE INVENTION

1. Field of the Invention

The present invention relates to a structure of a roll blind that is moved in a front-back direction of a vehicle to selectively shade a sunroof glass, and more particularly, to a structure of a roll blind using a dual roller that includes a main roller that is disposed at one end of a sunroof frame in a vehicle width direction and can rotate through a motor, an idle roller that is disposed in the vehicle width direction adjacent to the main roller, and a roller guide that is coupled to both ends of the main roller and the idle roller, a blind being wound around the main roller and the idle roller.

2. Description of Related Art

On the roof panel of the vehicle, an opening can be formed to discharge air of the inside of the vehicle or allow air of the outside of the vehicle to flow into the inside, and the opening can be opened and closed by the sunroof glass installed on a ceiling portion of the vehicle.

In particular, in recent years, a panorama sunroof of a type in which most of the loop panel is made of glass and a part thereof is selectively opened and closed for cool feeling of openness and excellent design aesthetic feeling has been often used.

The driver not only can receive much more natural sunlight when the vehicle runs and when the vehicle stops, but also can feel a cool feeling of driving by opening the panorama sunroof during running of the vehicle.

In general, a blind is installed together in the sunroof so as to be able to selectively shade the sunroof glass, and is used for cutting off the direct sunlight transmitted into the interior of the vehicle through the sunroof glass.

Such a blind is utilized for various purposes of preventing a temperature rise within the vehicle in summer, and preventing an occurrence of frost in the vehicle and preventing dazzling of the driver in winter.

As the above-described structure of the blind, roughly, there are roll blind type that winds fabric as a blind cloth around a blind shaft to open and close the sunroof glass, and a blind panel type that mounts a blind panel moving in the front-back direction to open and close the sunroof glass.

In the case of the roll blind type, this type is divided into a type of using two sheets of blinds made up of a front blind and a rear blind, and a type of shading the entire space of the sunroof glass using a sheet of blind.

The type of using a sheet of blind is advantageous in that an occupant of a rear seat is able to freely block sunlight when trying to block sunlight by changing a degree of opening of the blind, but since a diameter of the roller around which the blind is wound increases and occupies a wide space compared to the type of using two sheets of blinds, a head lining further comes down, and thus, there is disadvantage in that the interior space of the vehicle become insufficient.

Korean Patent Laid-Open No. 10-2013-0096418 discloses a configuration of "a panorama sunroof apparatus of a double roller type" in order to improve the disadvantage as described above.

Figure 1:
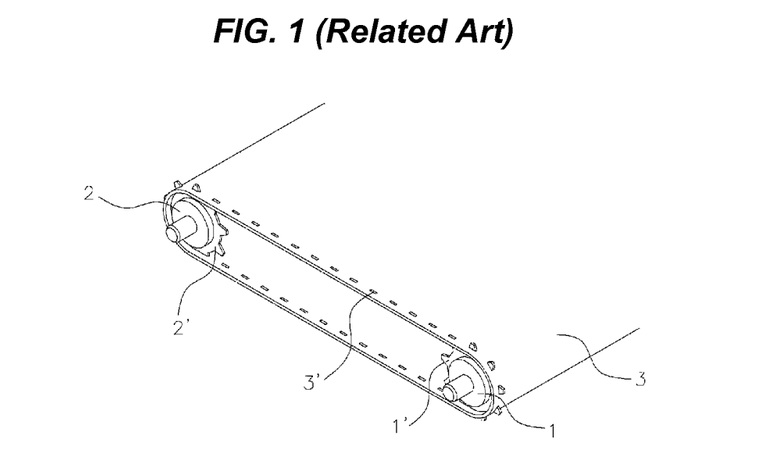
FIG. 1 is a perspective view showing an aspect of "panorama sunroof apparatus of a double roller type" according to the related art.

As shown in FIG. 1, the blind disclosed in Korean Patent Laid-Open No. 10-2013-0096418 is wound around a chain 3 coupled to a main roller 1 and an idle roller 2 coupled to one side of a sunroof rail (not shown) disposed on both left and right sides of the vehicle.

At this time, a main sprocket 1' and an idle sprocket 2' are coupled to both ends of the main roller 1 and the idle roller 2, a number of chain holes 3' are formed on a rim of the chain 3 and are fitted to the main sprocket 1' and the idle sprocket 2'.

However, in the "conventional double roller type panorama sunroof apparatus", there were problems in that since there is no guide structure for guiding a movement route of the blind when the blind moves and is wound, the blind is unevenly wound, and thus, wrinkles occur in the blind, and malfunction occurs.

In addition, there is a problem in that when the chain contracts or expands due to the influence of the environment such as a low temperature and high temperature, the blind slips without being tightly wound around the chain, or the main roller and the idle roller are not driven.

Furthermore, there is a problem of deflection of a central part of the chain, by adopting a structure in which the main sprocket and idle sprocket are coupled to both ends of the main roller and the idle roller and the chain hole is coupled thereto, that is, a structure in which only the side portion of the chain is driven.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a roll blind using a double roller in which the blind is uniformly wound by installing the guide portion in the movement route of the blind, a constant gap can always be maintained between the main roller and the idle roller so that the roller tube is not affected by environment, and the serrated portion and the gear portion are formed over the entire roller tube and roller to improve the problem of deflection of the central portion of the roller tube.

According to various aspects of the present invention, a structure of a roll blind using a double roller including a blind that moves in a front-back direction to selectively shade a sunroof glass disposed in a ceiling portion of a vehicle, may include a pair of sunroof frames formed on both lower sides of the sunroof glass in a longitudinal direction of the vehicle, a main roller disposed at one end of the sunroof frame in a vehicle width direction, a main roller disposed at one end of the sunroof frame in a width direction of the vehicle and rotating through a motor, an idle roller disposed in the vehicle width direction and adjacent to the main roller, a roller tube coupled to and wrapping the main roller and the idle roller to form a closed loop, and a roller guide coupled to both ends of the main roller and the idle roller and including a guide portion formed to protrude so that the blind maintains a constant height, in which rotational movement of the main roller due to the motor is transmitted to the idle roller by the roller tube, and the blind is coupled to the roller tube at a distal end, as the main roller is rotated by the motor, the blind is wound around the roller tube to open the sunroof glass.

Furthermore, the roller guide may include a first roller guide fixedly connected to the one end of the sunroof frame and having a through-hole for the idle roller to be rotatably coupled, and a second roller guide coupled to a rear end of the first roller guide and to which the main roller is rotatably coupled, and the guide portion is formed on a front side surface of the first roller guide.

Furthermore, the structure of the roll blind using the double roller may further include a number of springs disposed between the first roller guide and the second roller guide to apply tensile force to the first roller guide and the second roller guide, in which a constant gap is preferably maintained between the main roller and the idle roller by the spring.

In addition, the structure of the roll blind using the double roller may further include a hook-shaped first coupling portion extending to protrude rearward from the rear end of the first roller guide, and a second coupling portion recessed at a front end of the second roller guide corresponding to a shape of the first coupling portion, in which the first coupling portion and the second coupling portion are preferably fastened in a state in which a gap is formed between the first roller guide and the second roller guide.

In addition, the structure of the roll blind using the double roller may further include a hook-shaped fastening portion formed at a distal end of the main roller, and a slot formed in a vertical direction in the second roller guide to couple the fastening to the second roller guide, in which the main roller is coupled to the second roller guide by being pushed in an upward direction in a state of inserting the fastening portion into the slot.

In addition, the structure of the roll blind using the double roller may further include a plurality of serrated portions formed to protrude from an inner surface of the roller tube, a plurality of first gear portions formed on an outer circumferential surface of the idle roller for engagement with the serrated portions; and a plurality of second gear portions formed on the outer circumferential surface of the main roller for engagement with the serrated portions.

An effect of the present invention having the structure as described above is able to uniformly wind the blind by forming the guide portion so that the blind can maintain a constant height at the front end of a first roller guide, thereby preventing the wrinkling of the blind.

Further, there is an effect in that by combining a spring for providing tension between a first roller guide and a second roller guide such that a constant gap is always kept between the main roller and the idle roller, the roller tube always keeps a tight state regardless of the environmental influences, thereby improving the slipping problem between the roller and the roller tube, or the malfunction problem of the roller.

Further, there is an effect in that by forming a fastening portion at the distal end of the main roller and forming a slot in the second roller guide in a vertical direction such that the main roller can be fastened by being pushed in an upward direction from a downward direction, it is possible to easily perform the replacement or the like due to the failure of the main roller, and the assembly time and man-hours are reduced.

Additionally, there is an effect in that the problem of deflection of the central portion of the roller tube is improved, by forming the serrated portions on the inner surface of the roller tube and by forming the gear portions on the outer circumferential surfaces of the idle roller and the main roller, thereby significantly improving the malfunction phenomenon occurring due to the slip of the roller tube.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A structure of a roll blind using a double roller according to various embodiments of the present invention which includes a blind 20 moving in a front-back direction of a vehicle to selectively shade a sunroof glass 11 disposed in the ceiling portion of a vehicle, may include a pair of sunroof frames 10 formed on both lower sides of the sunroof glass 11 in a longitudinal direction, a main roller 40 that is disposed at one end of the sunroof frame 10 in a vehicle width direction and can rotate through a motor 43, an idle roller 30 that is disposed in the vehicle width direction and adjacent to the main roller 40, a roller tube 50 that is coupled to wrap the main roller 40 and the idle roller 30 to form a closed loop, and a roller guide 60 that is coupled to both ends of the main roller 40 and the idle roller 30 and includes a guide portion 71 formed to protrude so that the blind 20 can maintain a constant height, in which rotational movement of the main roller 40 due to the motor 43 is transmitted to the idle roller 30 by the roller tube 50, the blind 20 is coupled to the roller tube 50 at a distal end, and as the main roller 40 is rotated by the motor 43, the blind is wound around the roller tube 50 to open the sunroof glass 11.

Figure 2:
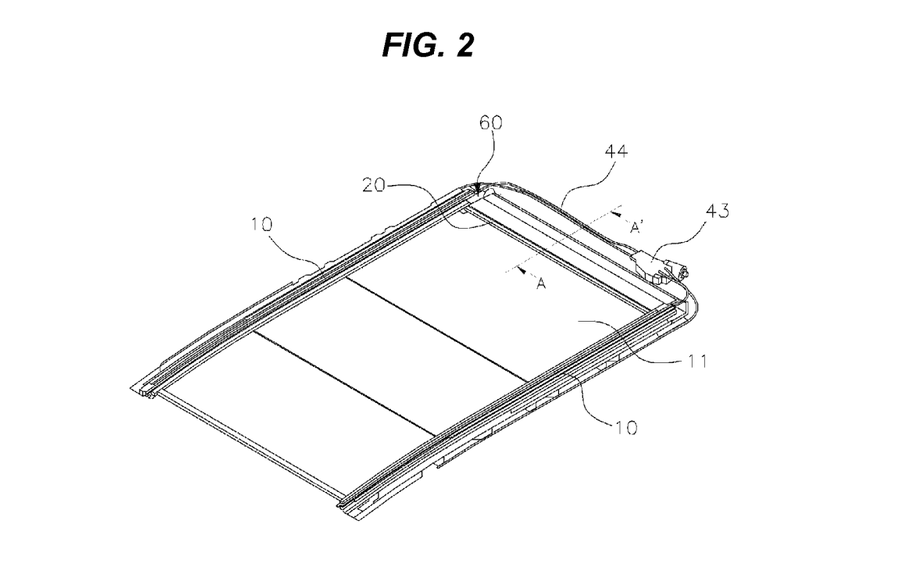
FIG. 2 is a perspective view showing an aspect in which an exemplary structure of a roll blind using a double roller is mounted to a vehicle according to the present invention.

As shown in FIG. 2, the sunroof glass 11 is mounted to the ceiling portion of the vehicle so as to be able to open and close, and serves to ventilate air of the interior the vehicle and provide an open feeling to the interior of the vehicle.

The sunroof glass 11 is operated in a type of sliding in the front-back direction of the vehicle or a type of being tilted-up in an up-down direction of the vehicle using a driving device such as a motor.

Typically, the sunroof glass 11 may be made of a material which effectively blocks ultraviolet and infrared rays, and may be formed variously by a transparent glass, an opaque glass or a synthetic resin. Additionally the subroof glass 11 may be formed of other similar materials depending on various factors.

As shown in FIG. 2, a pair of sunroof frames 10 formed in the longitudinal direction of the vehicle and configured in the form of a rail so as to allow the sunroof glass 11 to move back and forth are coupled to the left and right side portions respectively of the sunroof glass 11.

As shown in FIG. 2, the blind 20 capable of moving in the front-back direction is disposed below the sunroof glass 11, and the blind 20 is moved back and forth by the rotation of the main roller (40 of FIG. 3) which will be described below.

Figure 3:
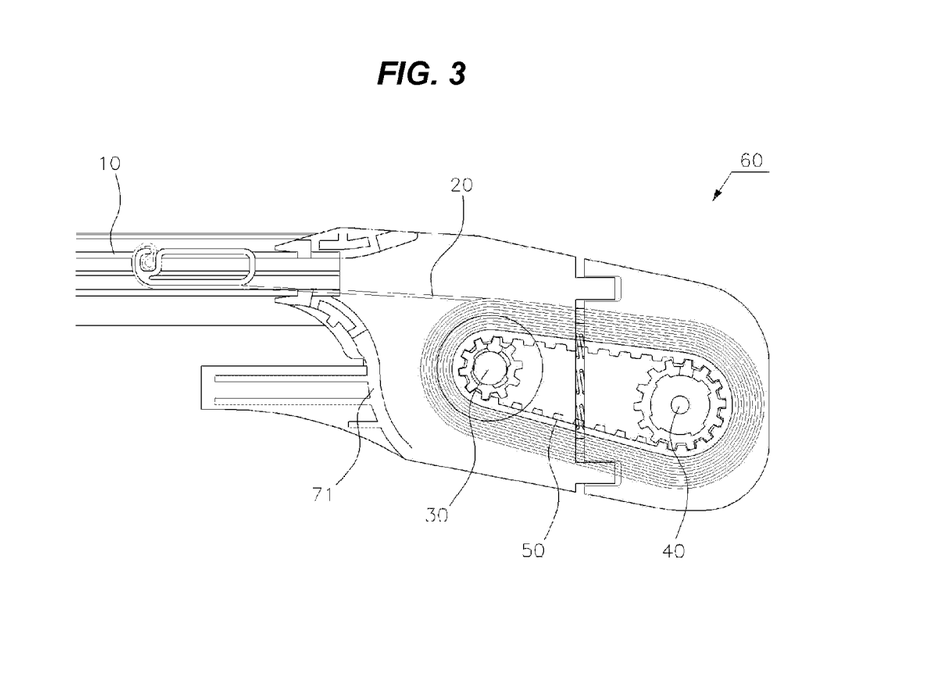
FIG. 3 is a cross-sectional view taken along a line A-A' of FIG. 2 according to the present invention.

As shown in FIGS. 2 and 3, the main roller 40 and the idle roller 30 disposed in the vehicle width direction are coupled to the rear end of the sunroof frame 10 and serve as shafts so that the blind 20 can be wound therearound.

The main roller 40 and the idle roller 30 can be coupled to various positions such as the front end or the central portion of the sunroof frame 10, depending on the type of the vehicle, the type of the sunroof glass 11, the arrangement of the sunroof glass 11 or the like.

As shown in FIGS. 2 and 3, the main roller 40 is connected to the motor 43 disposed on the rear of the sunroof frame 10 via a cable 44, and the motor 43 performs the forward rotation or the reverse rotation depending on the signal of an operation button that is conventionally installed separately to rotate the main roller 40 in a forward direction or in a reverse direction of the vehicle.

The blind 20 moves forward to shield the sunroof glass 11 or moves backward to wind around a roller tube 50 to be described later, depending on the forward rotation or the reverse rotation of the main roller 40.

As shown in FIG. 3, the main roller 40 and the idle roller 30 are formed in a form like a shaft having a circular cross-sectional shape, and a diameter of the cross section of the main roller 40 may be formed relatively greater than a diameter of the cross section of the idle roller 30.

This is to allow the blind 20 to be more stably wound when wound around the roller tube 50 that wraps the main roller 40 and the idle roller 30.

As shown in FIG. 3, the roller tube 50, which connects between the main roller 40 and the idle roller 30 and is formed to wrap the main roller 40 and the idle roller 30 thereby forming a closed loop, is coupled to the outer circumferential surfaces of the main roller 40 and the idle roller 30.

The roller tube 50 transmits the rotation of the main roller 40 to the idle roller 30 so that the idle roller 30 can rotate with the main roller 40, and serves to provide a space so that the blind 20 can be wound.

The distal end of the blind 20 is coupled to one side of the roller tube 50, when the main roller 40 is rotated by the motor 43, the roller tube 50 is rotated, and at this time, the blind 20 is wound around the roller tube 50.

As shown in FIGS. 2 and 3, a roller guide 60 is coupled between both ends of the main roller 40 and the idle roller 30 and the sunroof frame 10 and serves to support the main roller 40 and the idle roller 30.

As shown in FIG. 3, a guide portion 71 is formed to protrude from the front of the roller guides 60 so that the blind 20 can maintain a constant height when expanded or wound.

Figure 4:
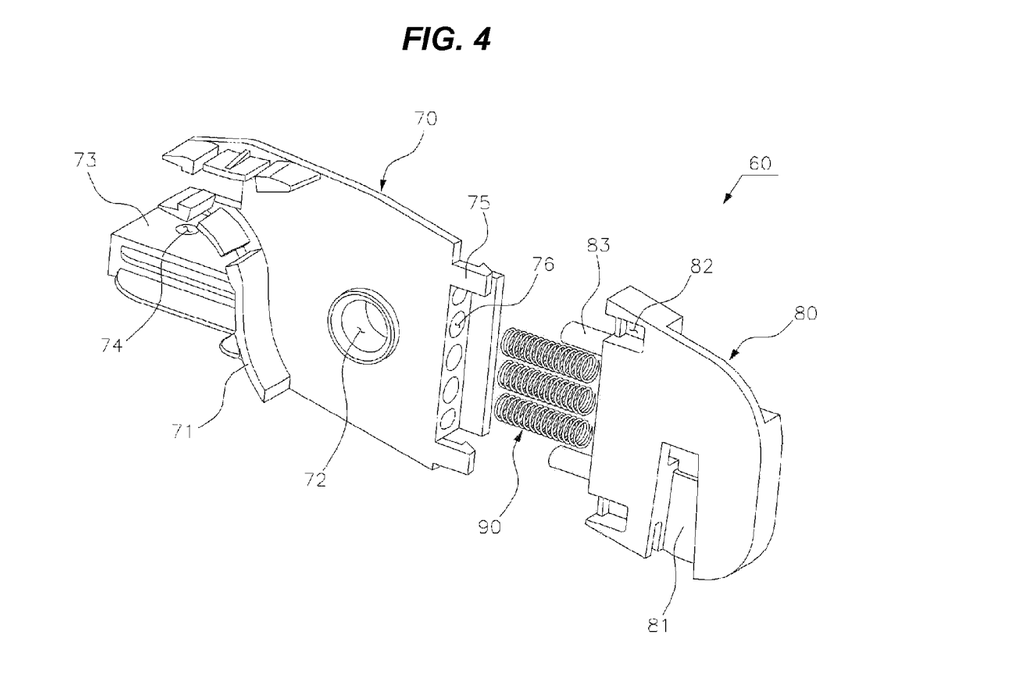
FIG. 4 is an exploded perspective view showing aspects of a first roller guide, a second roller guide, and a spring in the exemplary structure of a roll blind using a double roller according to the present invention.

As shown in FIG. 4, the guide portion 71 is formed to protrude in the vehicle width direction on the side surface of the roller guide 60, the upper portion of the guide portion 71 is curved toward the front, and a lower portion thereof is formed in a shape curved toward the rear.

As shown in FIG. 4, the roller guide 60 is formed with a through-hole 72, and is constituted by a first roller guide 70 to which the idle roller 30 is rotatably coupled, and a second roller guide 80 which is coupled to the rear end of the first roller guide 70 and to which the main roller 40 is rotatably coupled.

Figure 5:
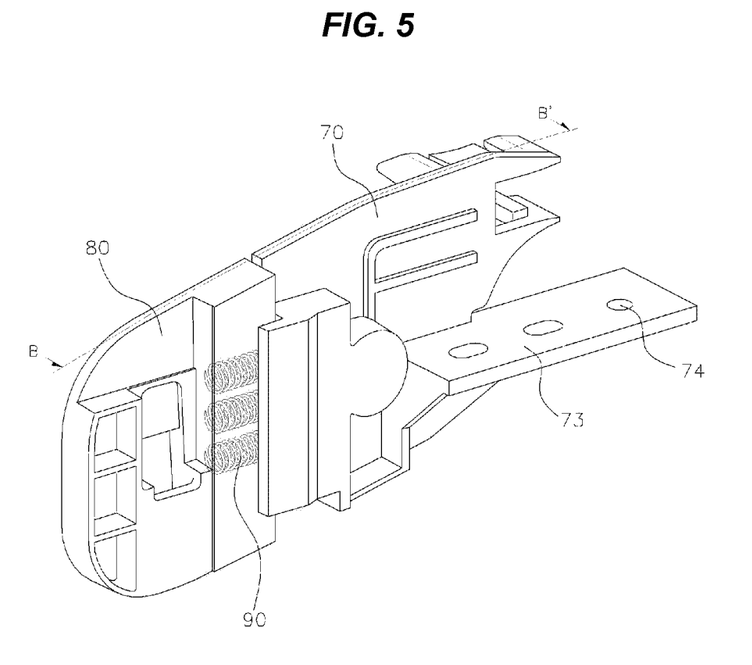
FIG. 5 is a perspective view showing an aspect of the assembly of the first roller guide, the second roller guide, and the spring in the exemplary structure of a roll blind using a double roller according to the present invention.

As shown in FIGS. 4 and 5, on a side portion of the first roller guide 70, a frame fastening portion 73 is formed which extends toward the front of the vehicle and is provided with a number of bolting holes 74 formed therethrough.

Figure 6:
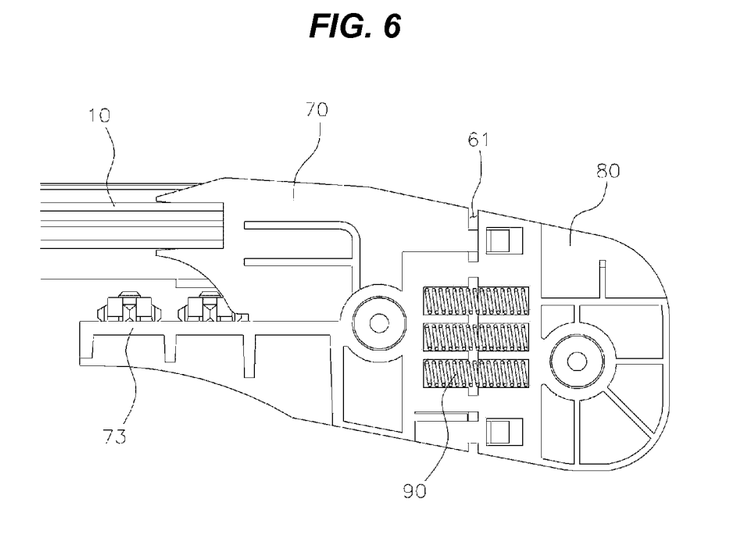
FIG. 6 is a cross-sectional view taken along a line B-B' in FIG. 5 according to the present invention.

As shown in FIG. 6, the first roller guide 70 is bolted and fixed to the sunroof frames 10 disposed at the left and right side portions through the bolting holes 74 formed in the frame fastening portion 73.

As shown in FIGS. 4 and 6, a number of springs 90 are disposed in the longitudinal direction of the vehicle between the first roller guide 70 and the second roller guide 80 to apply tensile force to the first roller guide 70 and the second roller guide 80.

That is, the first roller guide 70 and the second roller guide 80 always receive force to be pushed outward by the spring 90, whereby a constant gap is always maintained between the idle roller 30 and the main roller 40 coupled to the first roller guide 70 and the second roller guide 80 respectively, and the roller tube 50 coupled to the idle roller 30 and the main roller 40 will be maintained in a tight state.

In the illustrated embodiments, as the spring 90, a coil spring wound in a spiral shape is applied, and three springs are housed in spring holes 76 formed in the first roller guide 70 and the second roller guide 80.

Of course, as the spring 90, it is also possible to utilize any other material having elastic force, and various numbers of springs can be coupled between the first roller guide 70 and the second roller guide 80 by various fastening methods.

As shown in FIG. 4, a hook-shaped first coupling portion 75 extends to project to the rear end of the first roller guide 70, and a second coupling portion 82 having a form corresponding to the first coupling portion 75 is formed to be recessed at the front end of the second roller guide 80.

That is, the first roller guide 70 and the second roller guide 80 have a structure that is easily coupled even by application of little power in the state of inserting the first coupling portion 75 into the second coupling portion 82.

As shown in FIG. 4, a clearance prevention portion 83 extending to project forward is formed at the front end of the second roller guide 80, and the clearance prevention portion 83 is inserted into a hole formed at the rear end of the first roller guide 70 so that the first roller guide 70 and the second roller guide 80 are not moveable vertically and horizontally in the fastened state.

As shown in FIG. 6, the first coupling portion 75 and the second coupling portion 82 allow the first roller guide 70 and the second roller guide 80 to be coupled to each other while maintaining a predetermined gap 61 rather than completely adhering to each other.

The gap 61 serves to absorb a change of the roller tube 50 so that a constant gap can always be maintained between the main roller 40 and the idle roller 30, even if the roller tube 50 contracts or expands depending on a change in the environment such as a low temperature or a high temperature.

That is, even if the roller tube 50 contracts and a gap 61 between the first roller guide 70 and the second roller guide 80 to which the main roller 40 and the idle roller 30 are coupled is temporally reduced, the main roller 40 and the idle roller 30 are pushed outward by the tensile force of the spring 90, and the constant gap 61 is maintained between the first roller guide 70 and the second roller guide 80 again soon.

Figure 7:
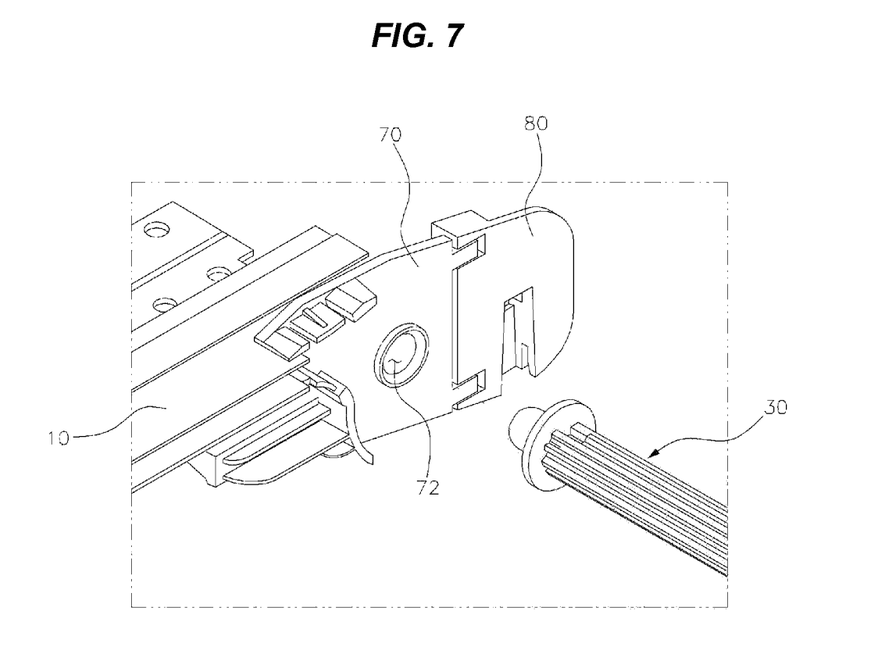
FIG. 7 is a perspective view showing an aspect in which the idle roller is coupled to the first roller guide in the exemplary structure of a roll blind using a double roller according to the present invention.

As shown in FIG. 7, the idle roller 30 may be coupled in a manner of horizontally sliding into the through-hole 72 of the first roller guide 70 coupled to the sunroof frame 10.

Figure 8:
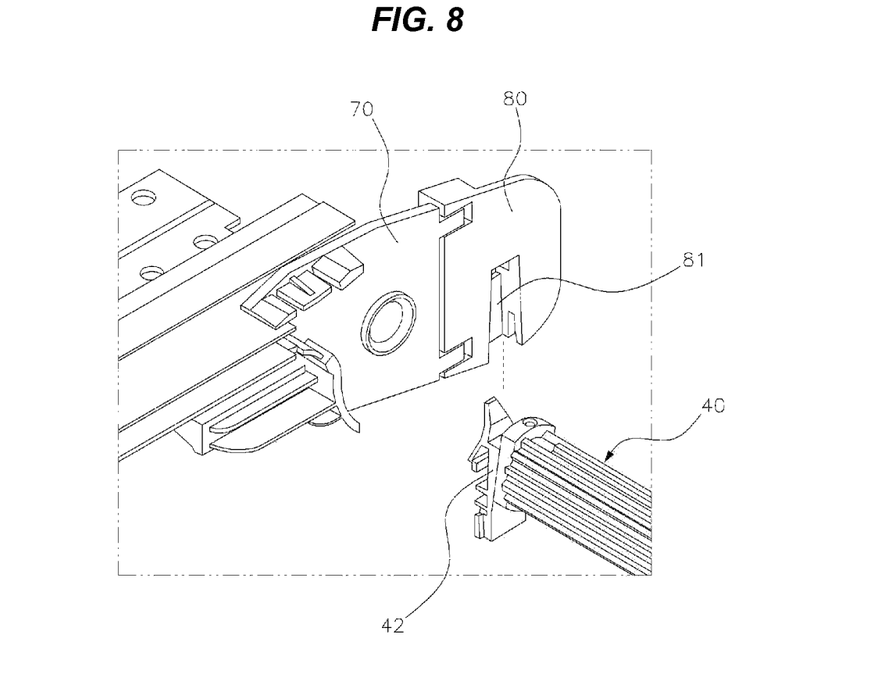
FIG. 8 is a perspective view showing an aspect in which the main roller is coupled to the second roller guide in the exemplary structure of a roll blind using a double roller according to the present invention.

As shown in FIG. 8, the main roller 40 may be coupled in a manner of inserting a hook-shaped fastening portion 42 formed at a distal end thereof into a slot 81 vertically formed in the second roller guide 80.

Figure 9:
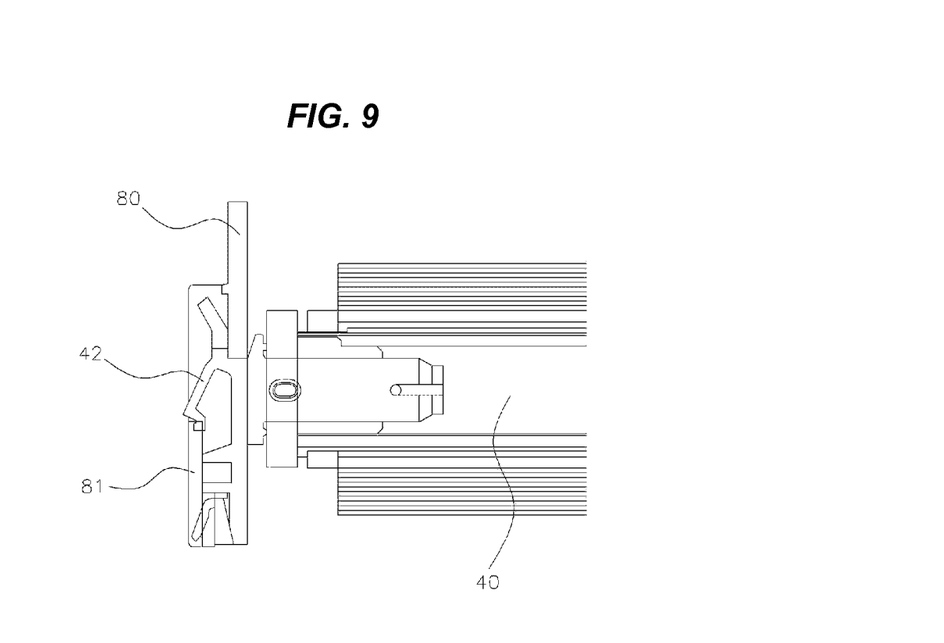
FIG. 9 is a cross-sectional view showing an aspect in which the main roller is coupled to the second roller guide by a fastening portion in the exemplary structure of a roll blind using a double roller according to the present invention.

As shown in FIG. 9, an upper portion of the fastening portion 42 is curved in the form of a hook, and the main roller 40 is fastened to the second roller guide 80 in a manner that the hook portion is engaged with the slot 81 formed in the second roller guide 80.

As shown in FIG. 8, the main roller 40 has a structure that is coupled to the second roller guide 80 by pushing in the upward direction from the downward direction, and has an advantage of convenience of replacement, removal, assembly or the like.

Figure 10:
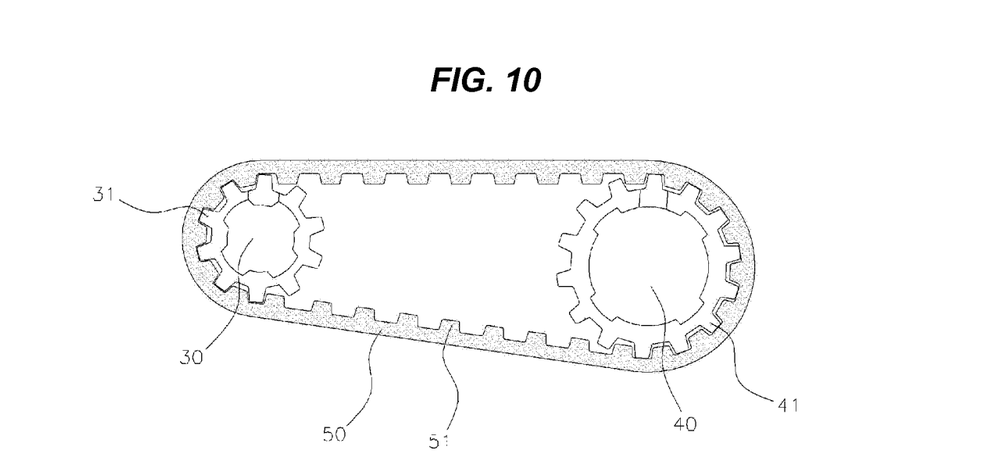
FIG. 10 is a cross-sectional view showing an aspect in which the main tube is coupled to the main roller and the idle roller in the exemplary structure of a roll blind using a double roller according to the present invention.

As shown in FIGS. 7, 8, and 10, a number of serrated portions 51 may be formed to project from the inner surface of the roller tube 50, and a number of first gear portions 31 and second gear portions 41 may be formed outer circumferential surfaces of the idle roller 30 and the main roller 40.

As shown in FIG. 10, the first gear portions 31 and the second gear portions 41 are formed by a structure that is exactly engaged with the serrated portions 51 formed on the roller tube 50, and thus, there are effects in which the slip phenomenon of roller tube 50 is greatly reduced and the deflection phenomenon of the central portion of the roller tube 50 is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a roll blind using a double roller including a blind that moves in a front-back direction of a vehicle to selectively shade a sunroof glass disposed in a ceiling portion of the vehicle, comprising:
    a pair of sunroof frames formed on both lower sides of the sunroof glass in a longitudinal direction of the vehicle;
    a main roller disposed at one end of the sunroof frame in a width direction of the vehicle and rotating through a motor;
    an idle roller disposed in the width direction of the vehicle and adjacent to the main roller;
    a roller tube coupled to and wrapping the main roller and the idle roller to form a closed loop; and
    a roller guide coupled to both ends of the main roller and the idle roller and including a guide portion formed to protrude so that the blind maintains a constant height,
    wherein rotational movement of the main roller due to the motor is transmitted to the idle roller by the roller tube,
    wherein the blind is coupled to the roller tube at a distal end, and as the main roller is rotated by the motor, the blind is wound around the roller tube to open the sunroof glass, and
    wherein the roller guide includes:
        a first roller guide fixedly connected to the one end of the sunroof frame;
        a second roller guide coupled to a rear end of the first roller guide; and
        a number of springs disposed between the first roller guide and the second roller guide to apply tensile force to the first roller guide and the second roller guide.

2. The structure of the roll blind using the double roller of claim 1, wherein the first roller guide has a through-hole for the idle roller to be rotatably coupled; and
    the main roller is rotatably coupled to the second roller guide, and wherein the guide portion is formed on a front side surface of the first roller guide.

3. The structure of the roll blind using the double roller of claim 1,
    wherein a constant gap is maintained between the main roller and the idle roller by the spring.

4. The structure of the roll blind using the double roller of claim 2, further comprising:
- a hook-shaped first coupling portion extending to protrude rearward from the rear end of the first roller guide; and
- a second coupling portion recessed at a front end of the second roller guide, corresponding to a shape of the first coupling portion,
- wherein the first coupling portion and the second coupling portion are fastened in a state in which a gap is formed between the first roller guide and the second roller guide.

5. The structure of the roll blind using the double roller of claim 3, further comprising:
- a hook-shaped first coupling portion extending to protrude rearward from the rear end of the first roller guide; and
- a second coupling portion formed to be recessed at a front end of the second roller guide in response to a shape of the first coupling portion,
- wherein the first coupling portion and the second coupling portion are fastened in a state in which a gap is formed between the first roller guide and the second roller guide.

6. The structure of the roll blind using the double roller of claim 2, further comprising:
- a hook-shaped fastening portion formed at a distal end of the main roller; and
- a slot formed in a vertical direction in the second roller guide to couple the fastening portion to the second roller guide,
- wherein the main roller is coupled to the second roller guide by being pushed in an upward direction in a state of inserting the fastening portion into the slot.

7. The structure of the roll blind using the double roller of claim 1, further comprising:
- a plurality of serrated portions formed to protrude from an inner surface of the roller tube;
- a plurality of first gear portions formed on an outer circumferential surface of the idle roller for engagement with the serrated portions; and
- a plurality of second gear portions formed on an outer circumferential surface of the main roller for engagement with the serrated portions.

* * * * *